United States Patent [19]

List et al.

[11] 4,399,706

[45] Aug. 23, 1983

[54] PRESSURE INDICATOR FOR MEASUREMENT OF HOT PRESSURE MEDIUMS

[75] Inventors: Helmut List; Peter Claassen; Rudolf Zeiringer, all of Graz, Austria

[73] Assignee: Hans List, Graz, Austria

[21] Appl. No.: 409,081

[22] Filed: Aug. 18, 1982

Related U.S. Application Data

[63] Continuation of Ser. No. 169,822, Jul. 7, 1980, abandoned.

[30] Foreign Application Priority Data

Aug. 9, 1979 [AT] Austria .................................. 5449/79

[51] Int. Cl.³ ............................................. G01L 19/04
[52] U.S. Cl. ...................................... 73/708; 73/115; 73/706; 73/726
[58] Field of Search ................. 73/115, 708, 706, 723, 73/726, 727, DIG. 4

[56] References Cited

U.S. PATENT DOCUMENTS

| | | | |
|---|---|---|---|
| 2,164,638 | 4/1938 | Broeze et al. | 73/DIG. 4 |
| 3,082,334 | 3/1963 | Riesen | 73/DIG. 4 |
| 3,785,209 | 1/1974 | Schijf | 73/706 |
| 3,857,287 | 12/1974 | Sonderegger | 73/706 |

*Primary Examiner*—Donald O. Woodiel
*Attorney, Agent, or Firm*—Watson, Cole, Grindle & Watson

[57] ABSTRACT

In a pressure indicator for measurement of hot pressure mediums, comprising an indicator housing adjustable to an opening in an enclosure for the medium to be measured, a measuring element, and a power train comprising a diaphragm connected to the housing and a power transmission element for connecting the diaphragm to the measuring element, a narrow gap is provided for between at least one of the parts of the power train on the one side and the housing on the other side, and that part of the housing being adjacent the gap is substantially in direct heat conducting connection with the enclosure for the medium when the indicator is adjusted to the opening therein.

11 Claims, 2 Drawing Figures

PRESSURE INDICATOR FOR MEASUREMENT OF HOT PRESSURE MEDIUMS

This is a continuation of application Ser. No. 169,822, filed July 7, 1980, now abandoned.

The transmission element and the diaphragm can conduct sufficient heat via the narrow gap to the indicator housing directly cooled by the enclosure for the hot pressure medium, whereby it is ensured, that even at high temperatures at the diaphragm the thermo-critical measuring element arranged at the other end of the transmission element is not heated up to an undue extent. No further cooling system is necessary, whereby the manufacturing and handling of the indicator is improved.

BACKGROUND OF THE INVENTION

This invention relates to a pressure indicator for measurement of hot pressure mediums, comprising an indicator housing adjustable to an opening in an enclosure for the medium to be measured, a measuring element, and a power train comprising a diaphragm connected to the housing and a power transmission element for connecting the diaphragm to the measuring element and wherein a narrow gap is provided for between at least one of the parts of the power train on the one side and the housing on the other side.

DESCRIPTION OF THE PRIOR ART

Pressure indicators for the measurement of hot pressure media, which are, e.g., destined for measurements at internal combustion engines, are so designed as to ensure that the measuring elements are effected by comparatively low temperatures only, as they would lose by their accuracy or ability of measurement, respectively, at higher temperatures.

It is known to protect the measuring element against higher temperatures of the medium to be tested by conducting the heat off that part of the indicator containing the measuring element by a separate cooling provided for the indicator. Further, it is known to use an elongated piston for transmitting the pressure to be measured to the measuring element. The piston is on the one side in operative connection with the diaphragm sealing the measuring system against the medium to be tested and on the other side, via a prestressing device, with the measuring element, whereby the measuring element is spaced from the heat source. The piston is supported for axial movement in a receiving unit; therefore the piston and the receiving unit have to show at least approximately the same functional relationship of temperature and elongation to prevent jamming. The receiving unit of this known arrangement is screwed with the indicator housing immediately nearby the prestressing device containing the measuring elements critical to temperature. A relatively wide gap is formed between that part of the housing screwed into the cooled enclosure for the medium to be tested and the receiving unit, which is isolating against transmission of heat. Though, the measuring elements critical to higher temperature are arranged away from the directly heated region, there is still transmitted that much heat to the measuring elements via the pressure transmitting piston and the receiving unit, which both are uncooled and made of highly heat conducting material, that a satisfying operation of this known arrangement is not possible for a longer time.

Furthermore, a pressure indicator of the kind mentioned above is known, e.g., from Austrian Pat. No. 285 207, which is cooled by a separate liquid circuit. The space directly scavenged by the coolant is so separated from the space adjacent the diaphragm or power transmitting element, respectively, as not to transmit vibrations or changes in pressure of the coolant to the inner side of the diaphragm, because this would cause, especially with low-pressure indicators, an uncontrollable influencing to the real measurements. The gap between diaphragm or power transmitting element, respectively, and the cooled housing part has preferably a width in the range from 0.01 to 0.1 mm only, whereby a sufficient heat transmision from the diaphragm or power transmitting element, respectively, is enabled. A significant disadvantage of this known indicator is that, because of the necessity of the separate coolant circuit, the arrangement and the handling of the pressure indicator is complicated.

SUMMARY OF THE INVENTION

It is an object of the present invention to improve a pressure indicator of the aforementioned type to ensure that the region containing the measuring element which is critical to higher temperatures has, without the need for extra cooling, a temperature which is lower than the highest allowable for the measuring element, although the indicator is used for measurements of hot pressure mediums.

According to this invention that part of the indicator housing being adjacent the gap between the diaphragm and/or the power transmission element on the one side and the housing on the other side is substantially in direct heat conducting connection with the enclosure containing the medium to be tested, when the indicator is adjusted to the opening in the enclosure. If the indicator is used, e.g., to measure the pressure in the combustion chamber of an internal combustion engine, the indicator housing usually is inserted directly into the water or air cooled cylinderhead and, therefore, kept at considerably low temperature by the cooling of the cylinderhead. The narrow gap between the diaphragm and/or the power transmission element on the one side and the indicator housing on the other side, which has preferably a width in the range of 0.01 to 0.1 millimeters, is just as wide as to guarantee a completely free axial mobility of the diaphragm and the power transmission element at all temperatures occuring. The transmission element and the diaphragm can conduct sufficient heat via the narrow gap to the indicator housing directly cooled by the engine cooling system, whereby it is ensured, that even at high temperatures at the diaphragm the thermo-critical measuring element arranged at the other end of the transmission element is not heated up to an undue extent.

According to a further development of this invention, the power transmission element is built by a thickened mid-portion of the diaphragm. By that thickened mid-portion fixedly arranged at the diaphragm a secure tensionally transmission of the pressure indicated diaphragm movements to the measuring element is guaranteed. It is possible to form the thickened mid-portion in one piece with the diaphragm or to fix an extra part to same.

In a still further development of the present invention, the diaphragm shows a heat shield at the thickened mid-portion, which at least partially overlaps the diaphragm. By the arrangement of the heat shield temporary changes in temperature can be avoided at the surface of the very delicate diaphragm, whereby, together with the better heat conduction via the narrow gap to the housing, a further increase in the durability of the diaphragm is gained.

According to another advantageous embodiment of this invention a stemple is arranged between the midportion of the diaphragm and the measuring element, acting as an additional power transmission element. This stemple yields in an increase of the surface at the disposal for the transmission of heat via the narrow gap to the housing. The length of the stemple is freely eligible, so that it is possible to arrange the measuring element in cooler regions of the indicator housing to avoid undue temperatures.

If the pressure indicator comprises a prestressing sleeve for the measuring element it is further possible that at least a part of the stemple is preformed in one piece with the bottom of the prestressing sleeve. Thereby, on the one hand the manufacturing of the indicator is simplified and on the other hand the use of different materials for the stemple and the prestressing sleeve, which function quite differently, is possible.

According to a further development of this invention the stemple is divided in axial direction into several parts, whereof at least one part has such a length and coefficient of thermal expansion as to compensate for the effect of thermal expansion on the measuring signals. The effects of changes in temperature, which can result in a different expansion of the parts of the indicator and thereby cause a force on the measuring element dependent on temperature resulting in an undue affection of the measuring signals, can be avoided largely by this special arrangement of the stemple.

The stemple is, according to another feature of the present invention, at least partially pipe-like, whereby the thermal conductivity of the stemple is decreased at a constant surface thereof for heat conduction to the indicator housing. On the other side, because of the reduced mass of the stemple acting as a transmission element between the diaphragm and the measuring elements, the frequency response of the indicator, and especially the upper cut-off-frequency thereof, is considerably improved.

According to a further embodiment of this invention, the narrow gap may be filled with a medium having low viscosity and good thermal conductivity. For that purpose, e.g., mercury or silicon grease can be used, which fills the narrow gap to improve the heat transmission without reducing the completely free axial mobility of the power train.

According to a still further development of this invention it is especially advantageous for the stemple to have a noncircular, preferably star-shaped, cross section, because thereby the surface at disposal for heat transfer to the indicator housing cooled by the enclosure of the hot pressure medium is considerably increased. Naturally, the narrow gap to the housing must also be maintained in this embodiment.

DESCRIPTION OF THE DRAWINGS

The present invention is hereinafter more particularly described with reference to the accompanying drawings, wherein.

DESCRIPTION OF THE PREFERRED EMBODIMENTS

Figure 1:
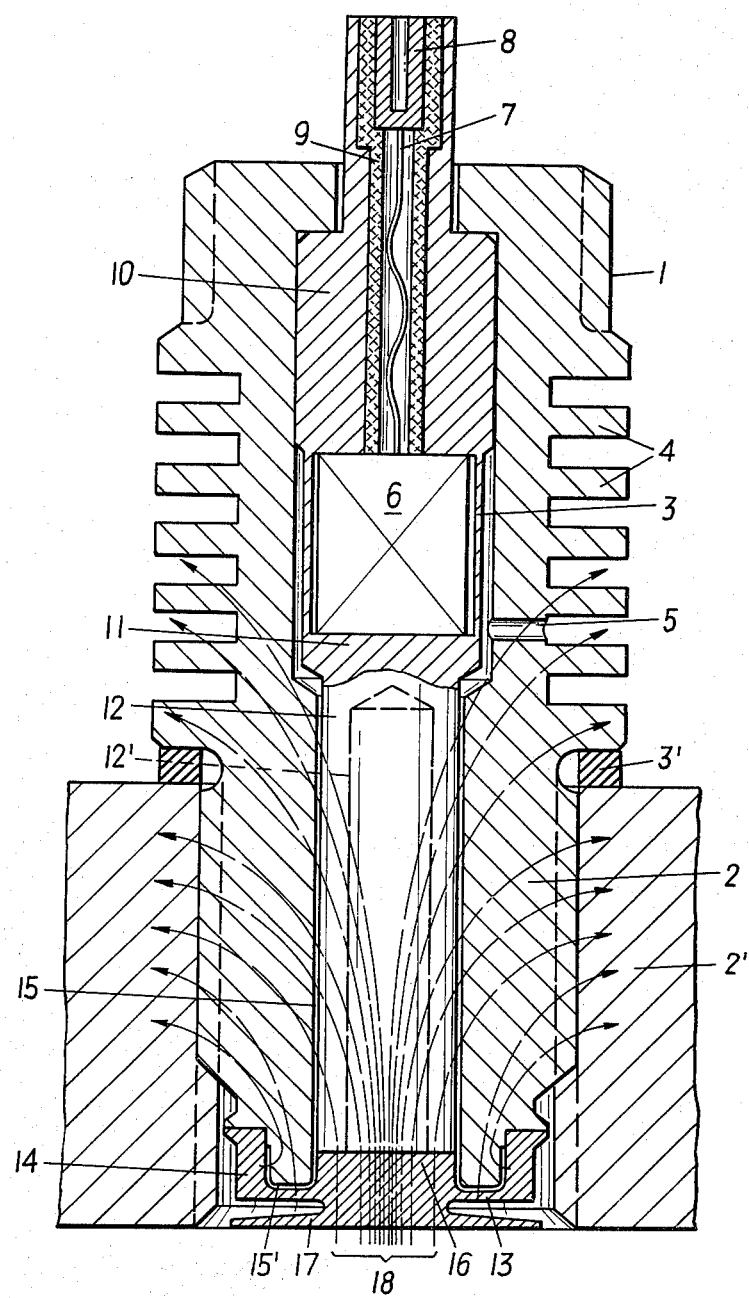
FIG. 1 shows a vertical cross section of a pressure indicator according to this invention in diagrammatic representation.

The indicator housing 1 of FIG. 1 shows a threaded part 2 by means of which it is screwed into a suitable opening in the combustion chamber wall 2' of an internal combustion engine (not shown) and sealed by a seal ring 3'. The indicator housing 1 is bored in an axial direction and includes cooling fins 4 at its outer side in the region containing a prestressing sleeve 3. The cooling fins 4 are arranged annularly around the indicator housing 1 and serve for cooling this part of the housing by heat emission. For the necessary venting of the inside of the indicator housing a bore 5 is provided. The prestressing sleeve 3 is performed with very thin walls and thereby functions in the manner of a bourdon tube. A diaphragm forming a mesuring element 6 is contained in the prestressing sleeve 3 whereat one pole of the electrical signal take-off is connected to the ground of the indicator housing and the other pole of the signal take-off is connected via a connecting cable 7 to a socket 8.

By means of the elastic prestressing sleeve 3, the upper part 10 and the bottom 11 of the prestressing sleeve 3, the measuring element 6 is prestressed to ensure good electrical contact and a defined zero adjustment for the measuring signals. A stemple 12 is made in one piece with the bottom 11 of prestressing sleeve 3 and acts for transmitting the pressure indicated movements of a diaphragm 13 to the measuring element 6. The stemple 12 has such a length that the prestressing sleeve 3 and the measuring element 6 which is contained therein and highly critical to temperature lie above the threaded part 2 of the indicator housing 1, whereby the measuring element 6 is situated outside that part of the indicator housing 1 which is directly heated when the pressure indicator is applied to the opening in the combustion chamber wall 2'.

It is also possible—as shown by dashed lines—to provide the stemple 12 with an axial bore 12' and preform it at least partially pipe-like. Thereby the mass of the stemple 12 is reduced at a constant outer surface adjacent a gap 15.

The diaphragm 13 is gas tight connected to the threaded part 2 of the indicator housing 1 at its rim 14, which has an increased wall thickness for increasing the heat conduction to the threaded part 2. Narrow gap 15 is maintained between stemple 12 and the threaded part 2 of the indicator housing 1, and a continuous similar gap 15' is maintained between the diaphragm 13 and the threaded part 2. On the one side the gaps 15 and 15' assure the necessary completely free mobility of the diaphragm 13 and of the stemple 12 relative to the housing 1, and on the other side the gaps 15 and 15' assure a sufficient heat conduction from the diaphragm 13 as well as from stemple 12 to the threaded part 2 of the housing 1 which is inserted into the cooled wall 2' of the combustion chamber.

At a thickened mid-portion 16 which interacts with stemple 12 the diaphragm 13 includes a heat shield 17, which partially overlaps the diaphragm 13. Thereby, the thin wall of the diaphragm 13 is protected against the direct influence of the flame front in the combustion chamber and the extremely high changes in temperature resulting therefrom, whereby the durability of the diaphragm is advantageously increased.

The heat conducted from the hot burning gases in the combustion chamber to the heat shield 17 and the diaphragm 13 propagates in the embodiment according to the present invention in the direction of arrows 18 and is conducted, still in the region of the threaded part 2 screwed into the wall of the combustion chamber, to a high extent to the cooled wall 2' of the combustion chamber. Thereby, it is ensured that without a separate cooling for the measuring element 6 the highest admittable temperature for a satisfactory function of the measuring element is not exceeded.

Figure 2:
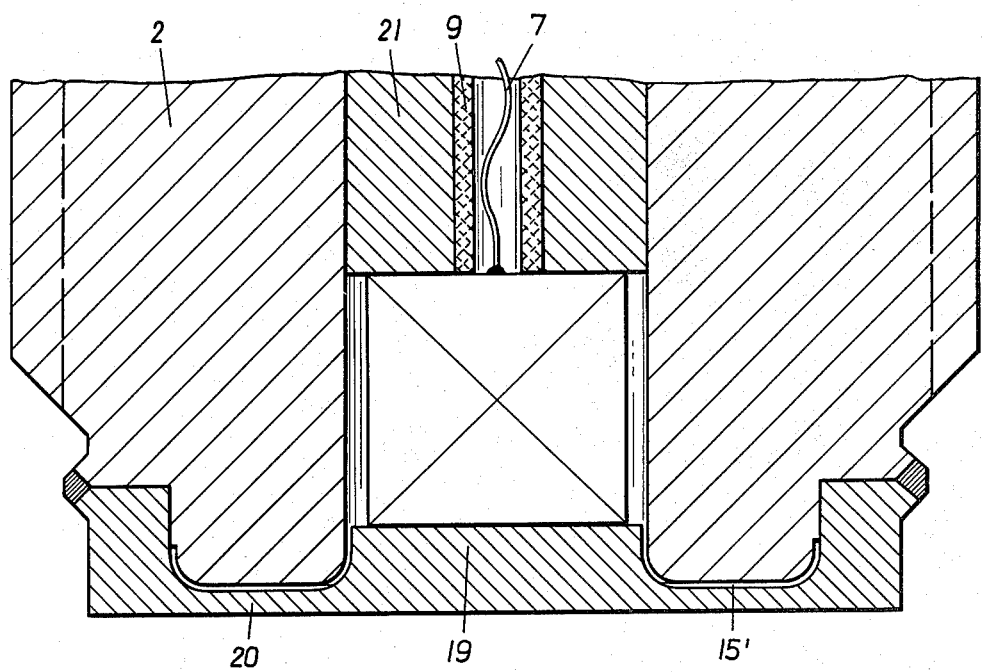
FIG. 2 shows partly a vertical cross section of another embodiment.

In another embodiment of the present invention, as depicted in FIG. 2, a power transmission element comprises a thickened mid-portion 19 of the diaphragm 20 only. The measuring element 6 is in direct contact with mid-portion 19 of the diaphragm 20, via which one pole of the signal take-off is conducted to the threaded part 2 of the indicator housing (not further shown) and thereby to ground. The other pole of the signal take-off is again conducted to a sleeve (not shown) by means of a connection cable 7 which is electrically insulated against a prestressing unit 21 by the insulator 9. The further arrangement and function of the pressure indicator depicted in FIG. 2 is the same as aforedescribed in connection with FIG. 1.

I claim:

1. A pressure indicator for measuring hot pressure media during combustion processes, comprising an indicator housing inserted within an opening of a cooled enclosure for the medium to be measured, a temperature-sensitive pressure measuring element disposed within said housing, a power train comprising a diaphragm of heat conductive material connected to an inner end of said housing and a power transmission element interconnecting said diaphragm with said measuring element, said diaphragm and said transmission element having abutting flat surfaces establishing a direct heat conducting interconnection therebetween, said power transmission element being, at least adjacent said diaphragm, of heat conductive material, and a narrow gap defined between at least one of the parts of said power train and a portion of said housing lying adjacent thereto, said portion of said housing being substantially in heat conducting connection with said enclosure, whereby the region of said housing containing said measuring element is maintained at a suitably low temperature, without the need for external cooling, as heat is conducted via said gap to said housing which is directly cooled by said enclosure.

2. A pressure indicator according to claim 1, wherein said narrow gap has a width in the range of 0.01 to 0.1 millimeters.

3. A pressure indicator according to claim 1, wherein said power transmission element comprises a thickened mid-portion of said diaphragm.

4. A pressure indicator according to claim 3, wherein said diaphragm includes a heat shield at said mid-portion, which at least partially overlaps said diaphragm.

5. A pressure indicator according to claim 3, wherein a stemple is arranged between said mid-portion and said measuring element, acting as an additional power transmission element.

6. A pressure indicator according to claim 5, comprising a prestressing sleeve for the measuring element, and wherein at least a part of said stemple is preformed in one piece with the bottom of said prestressing sleeve.

7. A pressure indicator according to claim 5, wherein said stemple is divided in axial direction into several parts, whereof at least one has such a length and coefficient of thermal expansion as to compensate the effect of thermal expansion on the measuring signals.

8. A pressure indicator according to claim 5, wherein said stemple is at least partially pipe-like.

9. A pressure indicator according to claim 5, wherein said stemple has a noncircular cross section for increasing the outer heat transfer surface thereof.

10. A pressure indicator according to claim 9, wherein said cross section of said stemple is star-shaped.

11. A pressure indicator according to claim 1 wherein the narrow gap is filled with a medium having low viscosity and good thermal conductivity.

* * * * *